United States Patent [19]
Mano et al.

[11] Patent Number: 5,801,359
[45] Date of Patent: Sep. 1, 1998

[54] TEMPERATURE CONTROL THAT DEFECTS VOLTAGE DROP ACROSS EXCITATION COIL IN IMAGE HEATING APPARATUS

[75] Inventors: Hiroshi Mano, Tokyo; Minoru Hayasaki, Yokohama, both of Japan

[73] Assignee: Canon Kabushiki Kaisha, Tokyo, Japan

[21] Appl. No.: 788,351

[22] Filed: Jan. 27, 1997

Related U.S. Application Data

[63] Continuation of Ser. No. 500,453, Jul. 10, 1995, abandoned.

[30] Foreign Application Priority Data

Jul. 8, 1994 [JP] Japan ................................ 6-180962
Mar. 2, 1995 [JP] Japan ................................ 7-068826

[51] Int. Cl.⁶ .................. H05B 6/06; H05B 6/10; G03G 15/20
[52] U.S. Cl. .................. 219/667; 219/618; 219/672; 399/329; 399/335; 399/338
[58] Field of Search .................. 219/618, 619, 219/667, 635, 672, 675, 216; 355/285, 286, 289; 399/336, 335, 337, 338, 328, 329, 330, 331

[56] References Cited

U.S. PATENT DOCUMENTS

| | | | |
|---|---|---|---|
| 2,898,435 | 8/1959 | Crafts | 219/667 |
| 4,317,979 | 3/1982 | Frank et al. | 219/665 |
| 4,570,044 | 2/1986 | Kobayashi et al. | 219/667 |
| 4,668,851 | 5/1987 | Kupper | 219/667 |
| 5,247,336 | 9/1993 | Mills, III | 219/619 |
| 5,568,235 | 10/1996 | Amarakoon | 219/619 |
| 5,568,240 | 10/1996 | Ohtsuka | 219/619 |

FOREIGN PATENT DOCUMENTS

| | | | |
|---|---|---|---|
| 58-35568 | 3/1983 | Japan | 219/619 |
| 4-44075 | 2/1992 | Japan . | |
| 4-44076 | 2/1992 | Japan . | |
| 4-44077 | 2/1992 | Japan . | |
| 4-44078 | 2/1992 | Japan . | |
| 4-44079 | 2/1992 | Japan . | |
| 4-44080 | 2/1992 | Japan . | |
| 4-44081 | 2/1992 | Japan . | |
| 4-44082 | 2/1992 | Japan . | |
| 4-44083 | 2/1992 | Japan . | |
| 4204980 | 7/1992 | Japan . | |
| 4204984 | 7/1992 | Japan . | |

*Primary Examiner*—Philip H. Leung
*Attorney, Agent, or Firm*—Fitzpatrick, Cella, Harper & Scinto

[57] ABSTRACT

A temperature detecting apparatus, includes an excitation coil magnetically couplable with metal layer of a heater, the excitation coil being supplied with an AC electric energy; and a detector for detecting a voltage drop, across the excitation coil, which changes with temperature of the heater. The metal layer has a metal ring and the excitation coil is magnetically connected with the metal ring.

8 Claims, 10 Drawing Sheets

TEMPERATURE CONTROL THAT DEFECTS VOLTAGE DROP ACROSS EXCITATION COIL IN IMAGE HEATING APPARATUS

This application is a continuation of application Ser. No. 08/500,453 filed Jul. 10, 1995 now abandoned.

FIELD OF THE INVENTION AND RELATED ART

The present invention relates to a temperature sensor for an apparatus for heat-fixing an image, usable with a copying machine or printer.

As a temperature sensor for a heat-fixing apparatus, thermisters are widely used since they are inexpensive and reliable. However, the thermister involves a problem that the temperature detecting range is small because of the structure thereof, and therefore, the reliability of the temperature detection immediately after the electric power or energy supply to the fixing apparatus is relatively low.

In an image fixing apparatus in which the thermal capacity of elements are reduced to reduce the warming-up period and the power consumption, the response speed of the thermister is not sufficient.

SUMMARY OF THE INVENTION

Accordingly, it is a principal object of the present invention to provide a temperature sensor having a wide detectable temperature range, and an image fixing apparatus using the same.

It is another object of the present invention to provide a temperature sensor having good responsivity and an image fixing apparatus using the same.

According to an aspect of the present invention, there is provided a temperature detecting apparatus, comprising: an excitation coil magnetically couplable with a heater, the excitation coil being supplied with an AC electric energy; and means for detecting a voltage drop, across the excitation coil, which changes with temperature of the heater.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
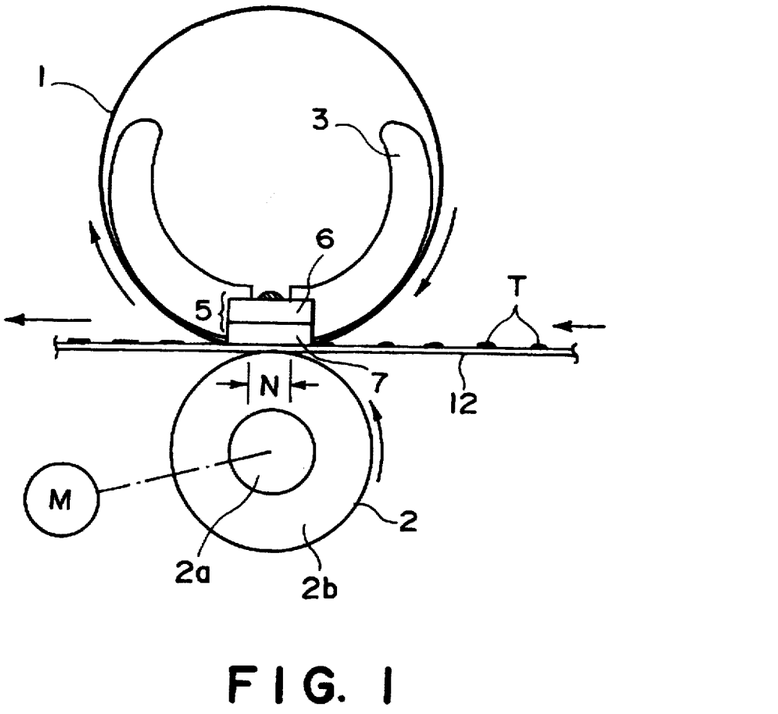
FIG. 1 is a sectional view of an image fixing apparatus using a temperature sensor according to an embodiment of the present invention.
Figure 2:
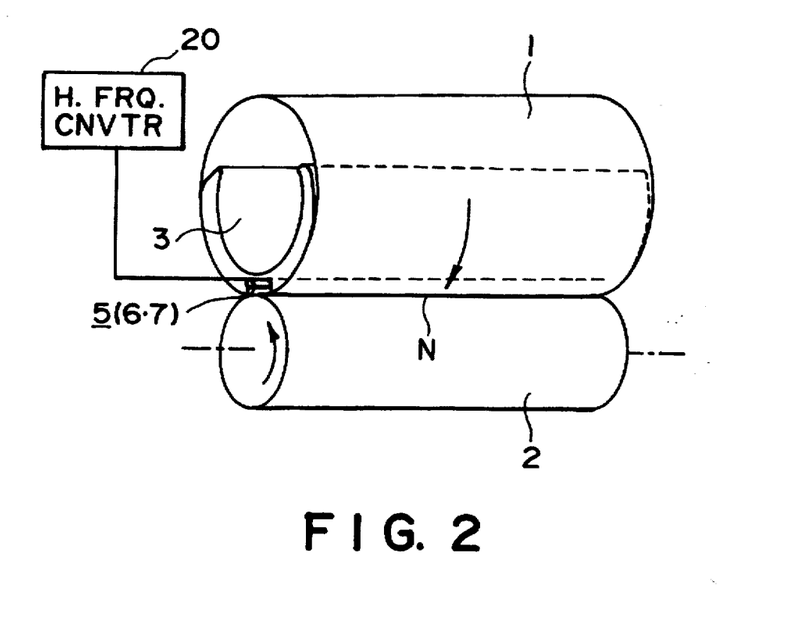
FIG. 2 is a perspective view of an image fixing apparatus shown in FIG. 1.

FIG. 1 shows an image heat-fixing apparatus (image heating apparatus) of magnetic induction type or film heating type using a temperature sensor according to a first embodiment of the present invention. FIG. 2 is a perspective view of the apparatus.

The apparatus is a tensionless type as disclosed in Japanese Laid-Open Patent Applications Nos. 44075/1992-44083/1992, 404980/1992-204984/1992. The tensionless type apparatus uses an endless or cylindrical heat resistive film (fixing film). At least a part of the circumference of the film is always tension free (without tension), and the film is rotated by the driving force of a pressing member.

Designated by a reference numeral 1 is a heat resistive film in the form of an endless belt (cylindrical). As will be described hereinafter, it is extended around a film inside guide (stay) field (excitation) coil unit 6 and a heater 5 (magnetic induction heating assembly) including a heat generating portion in the form of magnetic metal member (heater metal) 7.

The internal circumferential length of the heat resistive film 1 and the external circumferential length of the guide 3 containing the heater 5 are such that the former is larger by 3 mm approximately, for example. Therefore, the film 1 is loosely extended around the guide 3.

In order to improve the quick starting property by reducing the thermal capacity of the film, the thickness of the film is preferably 100 μm or lower, further preferably not more than 50 μm and not less than 20 μm. The material thereof is a single layer film of heat resistive PTFE, PFA, FEP or the like, or a multi-layer film having a base layer of polyimide, polyamidemide, PEEK, PES, PPS or the like and a coating layer of PTFE, PFA, FEP or the like.

The heater metal 7 of the heater 5 is faced down and exposed downwardly. It is embedded along the length of the guide substantially at the center. The film inside guide 3 has a semispherical cross-section and is of a material having rigidity and heat resistivity such as heat curing resin material or the like.

A pressing roller 2 cooperates with the heater 5 to form a nip (fixing nip) N therebetween with the film 1 interposed therebetween. The pressing roller functions to rotate the film (pressing member driving type).

The pressing roller 2 comprises a core metal 2a and a heat resistive rubber layer 2b having a high parting property such as silicone rubber or the like. It is urged to the bottom surface of the heater metal 7 of the heater by an unshown bearing means and an urging means at a predetermined pressure with the film therebetween. It is rotated in the counterclockwise direction as indicated by a driving means N.

By the friction between the outer surface of the film and the roller during the rotation of the pressing roller 2, the rotating force is applied to the film, and the film 1 is moved in close sliding contact with the bottom surface of the heater metal 7 of the heater 5.

When the temperature of the heater 5 reaches a predetermined level, and the rotating peripheral speed of the film by the pressing roller 2 is stabilized, a recording material 12 having an image to be fixed (a member to be heated) is introduced by an unshown image forming station into between the pressing roller 2 and the film 1 in the fixing nip N formed between the heater 5 and the pressing roller 2 with the film 1 therebetween. The recording material is gripped and fed through the nip N together with the film 1, by which the heat from the heater metal 7 of the heater 5 is applied to the recording material 12 through the film 2, so that the unfixed toner image T on the recording material 12 is heat-fixed on the recording material 12. Thereafter, the recording material 12 having passed through the fixing nip N is separated from the surface of the film 1, and is discharged to the outside of the apparatus.

This apparatus is not limited for heat-fixing the image, but is usable for heating a member or material in the form of a sheet, for example improving a surface property (glossiness or the like) by heating the recording material having an image, or for an apparatus for temporarily fixing the image.

The heater 5 is a magnetic induction heating assembly comprising a field coil unit 6 and a heater metal (heat generating portion) 7. The heater 5 is an elongated member having a length equal to or longer than the maximum width of the recording material 12 used with the apparatus.

Figure 3:
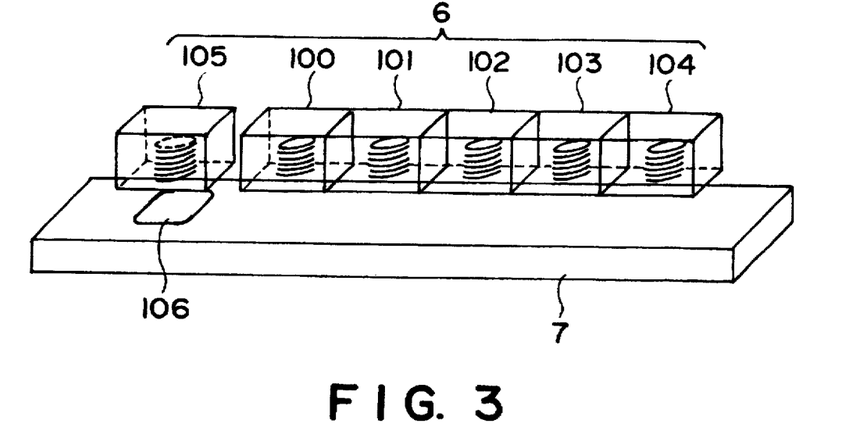
FIG. 3 schematically shows a heater portion of the image fixing apparatus and the structure of the temperature sensor.

As for the field coil unit 6, various structures are usable. In this embodiment, as shown in FIG. 3, 5 sets of field (excitation coils 100–104 are connected in series. Designated by a reference numeral 105 is a field coil for temperature detection, which will be described in detail hereinafter. In FIG. 2, a reference numeral 20 designates a high frequency converter for supplying a high frequency current to the coils 100–105 of the field coil unit 6.

A high frequency current generated by the high frequency converter 20 is applied to the field coils 100–104, and then, a high frequency magnetic field acts on the heater metal 7 below the field coil unit 6.

When the high frequency magnetic field is applied to the heater metal 7, the magnetic flux forms a loop starting at the center of the coil where the magnetomotive force is produced and returning to the center of the coil, through the minimum magnetic resistance. Although not shown in FIG. 3, a magnetic circuit, that is, a magnetic path by high permeability material to permit penetration and coupling with the heater metal 7 with high efficiency, is formed inside.

The high frequency magnetic field generated by the field coils 100–104 of the field coil unit 6 is magnetically coupled with the heater metal 7, and the heater metal 7 is heated by the eddy current loss provided by the magnetic field. By the heat from the heater metal 7, the recording material 12 is heated through the heat resistive film 1.

Figure 4:
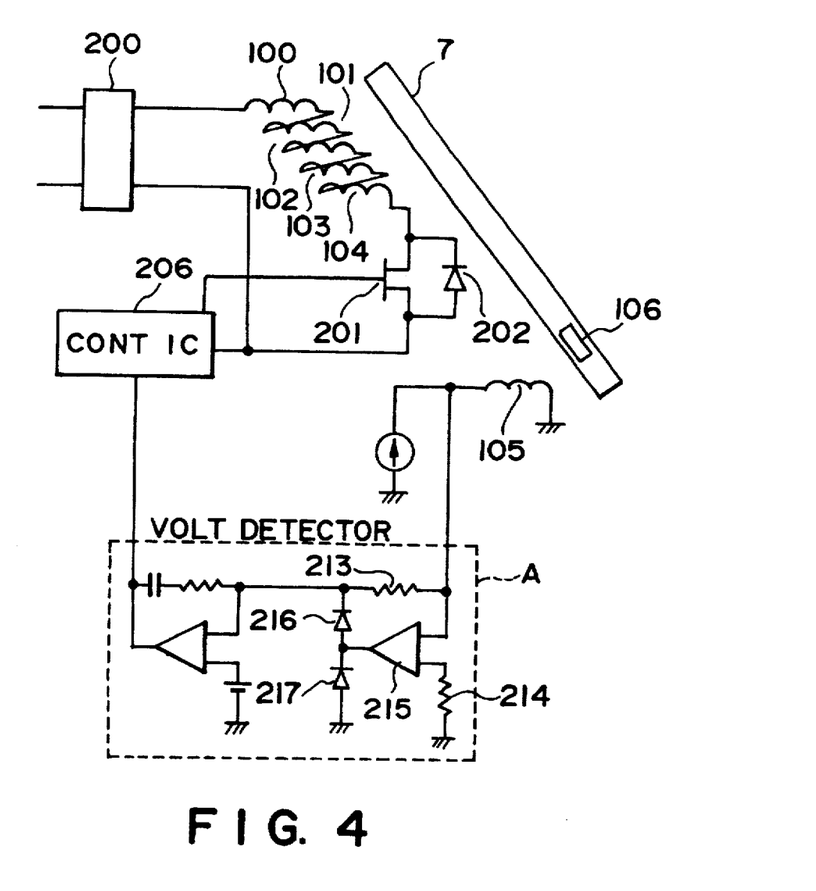
FIG. 4 is a circuit diagram of an electric energy supply controller and a temperature detecting circuit according to an embodiment of the present invention.

FIG. 4 shows the state in which the high frequency converter 20 supplies switching electric energy. In the Figure, the utility AC current supplied through the line is subjected to the both wave rectification by a rectifier (rectifying bridge) 200 and is supplied to an end of the field coil. A high frequency switching is effect by a switching semiconductor (FET) 201 connected to the other end of the coil.

The heater metal 7 is magnetically coupled in the manner described above, and therefore, it can be expressed as an equivalent circuit which is the same as the switching transformer of the voltage source. This is further shown in detail in FIG. 5. In this Figure, designated by 206 is a controlling IC circuit, and a part of the circuit for the operation is shown.

A part of the surface of the heater metal 7 faced to the temperature detection coil 105 of the field coil unit 6, is provided with a metal ring (copper) 106 (FIG. 3) embedded therein. When the magnetic flux from the coil 105 is magnetically coupled with the copper ring 105, eddy currents occurs inside the copper ring 106, and the voltage can be detected as a voltage drop of the coil 105.

FIG. 4 shows a circuit A for detecting or measuring the voltage by the temperature sensor coil 105. An AC sine wave constant current is applied to the coil 105, and the voltage drop resulting in the coil 105 is detected by a wave form rectifying circuit as a DC voltage.

The voltage thus detected is compared with a reference voltage corresponding to a reference temperature which will be described hereinafter, and the difference is amplified. The error signal is supplied to the controlling IC circuit 206 as a control signal. As a result, the controlling IC circuit 206 changes a waveform (switching duty, frequency or the like) applied to the field coils 100–104, so as to control the supply electric energy to maintain a constant temperature of the heater metal 7.

Figure 5:
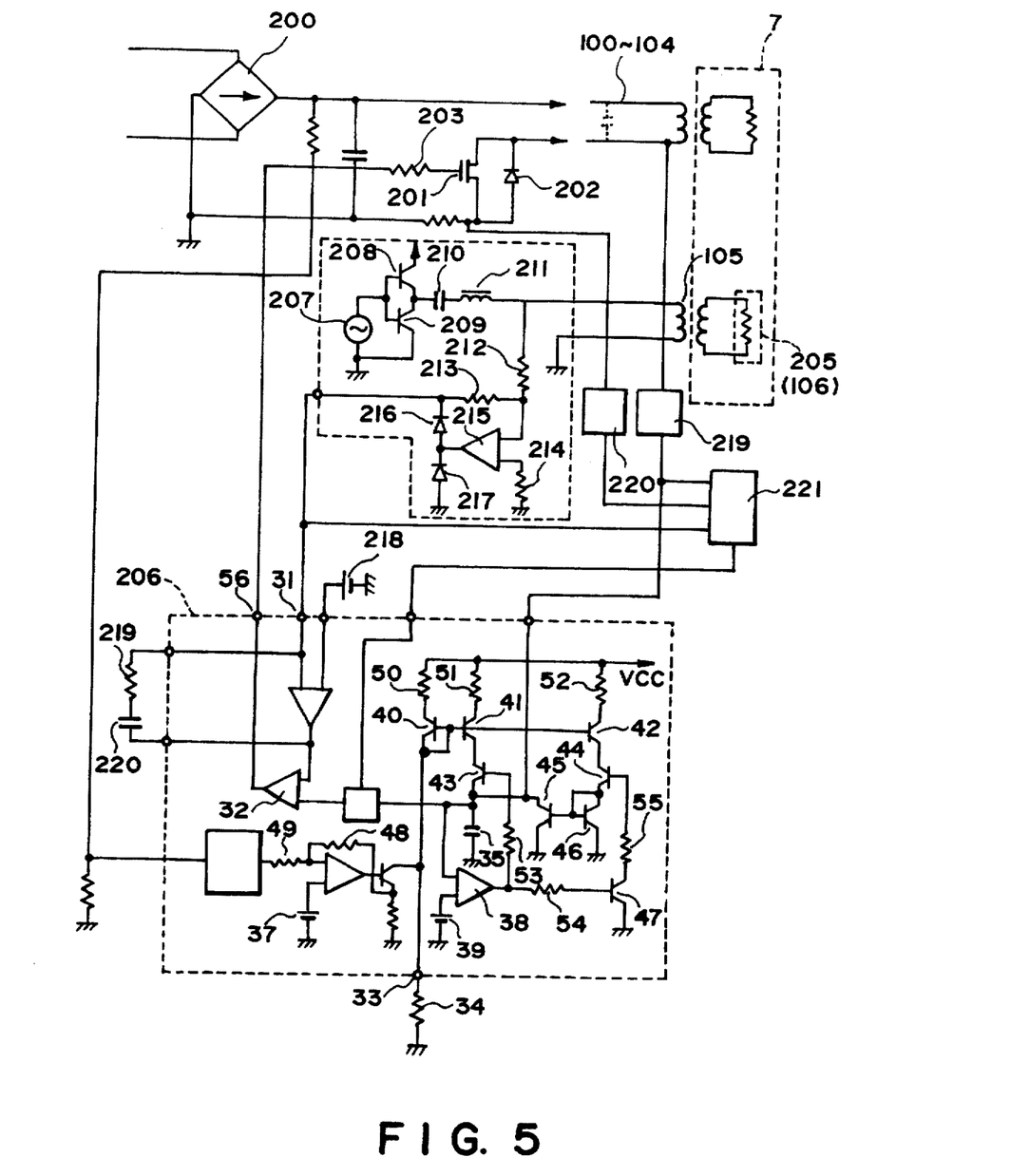
FIG. 5 is a detailed circuit diagram of the system shown in FIG. 4.

Referring to FIG. 5, the more detailed description will be made. The heater metal 7 is excited and heated by the field coils 100–104. The temperature of the heater metal 7 thus excited is proportional to the voltage drop due to the current through the resistor 205 (FIG. 5) through the copper ring 106 faced to the temperature sensing field coil 105 shown in FIG. 3.

In order to sense the temperature, the voltage of the AC voltage source 207 is sufficiently amplified in the amplitude by a couple of transistors 208 and 209 which are complementarily connected. Thereafter, it is converted to a constant current by a coil 211 through a coupling capacitor 210 for cutting a DC component, and thereafter, it is supplied to the temperature detecting field coil 105.

The magnetic field of the coil 105 is coupled with the copper ring 106 mounted to the surface of the heater metal 7 to generate ring current. The electromotive force required for generating the ring current is supplied from the coil 105, and therefore, when the coil 105 is driven by a constant current as described above, a voltage corresponding to the voltage drop is produced across the coil 105.

Then, the voltage of the coil 105 is rectified through a rectifying circuit using operational amplifier 215, and is electrically charged at the peaks, thus converting to a DC voltage.

The converted DC voltage corresponds to the voltage drop produced by the copper ring 106 of the heater metal 7, and therefore, if the resistivity of the copper changes due to the temperature change of the heater metal 7, the voltage drop represents the change of the resistivity.

The resistivity of the copper changes relative to the temperature with the following equation:

$$R=R1\ (1+(t-t_2)/(234.5+t_1))$$

R: resistance (ohm) of copper at temperature t
R1: resistance (ohm) of copper at temperature $t_1$
t: Temperature of copper (°C.)
$t_1$: temperature of copper (°C.)
$t_2$: ambient temperature (°C.)

Since the field coil 105 is driven by constant current, the above can be expressed by the voltage drop as follows:

$V = V1 \, (1+(t-t_2)/(234.5+t_1))$

V: voltage drop (V) at temperature t
V1: voltage drop (V) at temperature $t_1$

Therefore, by measuring beforehand a voltage (V1) at a known temperature ($t_1$), the heater metal temperature (=t) can be definitely determined on the basis of the detection (V) of the voltage drop.

The detected voltage is supplied to a contact 31 as a signal indicative of the temperature, it is compared with a target temperature 218, and the difference is amplified. The pulse width modulation control is carried out in response to the input voltage through the comparator 32.

The pulse width modulation is such that the gate of FET 201 for effecting the switching drive for the field coils 100-104 is driven, and the electric energy to be supplied (switching waveform) is changed.

With the above-described structure, the control is effected by the modulation of the field coil driving waveform (high frequency wave), and a linear temperature control is accomplished in consideration of the range of the temperature used.

Thus, the temperature change of the heater is instantaneously reflected as a voltage drop of the temperature sensor excitation coil, and therefore, the responsivity to quicker than in the thermister or the like in which a resistor sensitive to heat is contacted to the heater and the voltage is detected.

The resistor 219 and capacitor 220 connected to the error amplifier functions to correct the detected voltage (temperature) in the phase, and cooperates with the operational amplifier to effect proportional integration operation, the signal indicative of the error provides the high speed loop control optimum to the target temperature. Accordingly, the control using CPU as in the conventional example is not inevitable, and more accurate temperature converging (FIG. 7) is accomplished than in the prior art.

Figure 6:
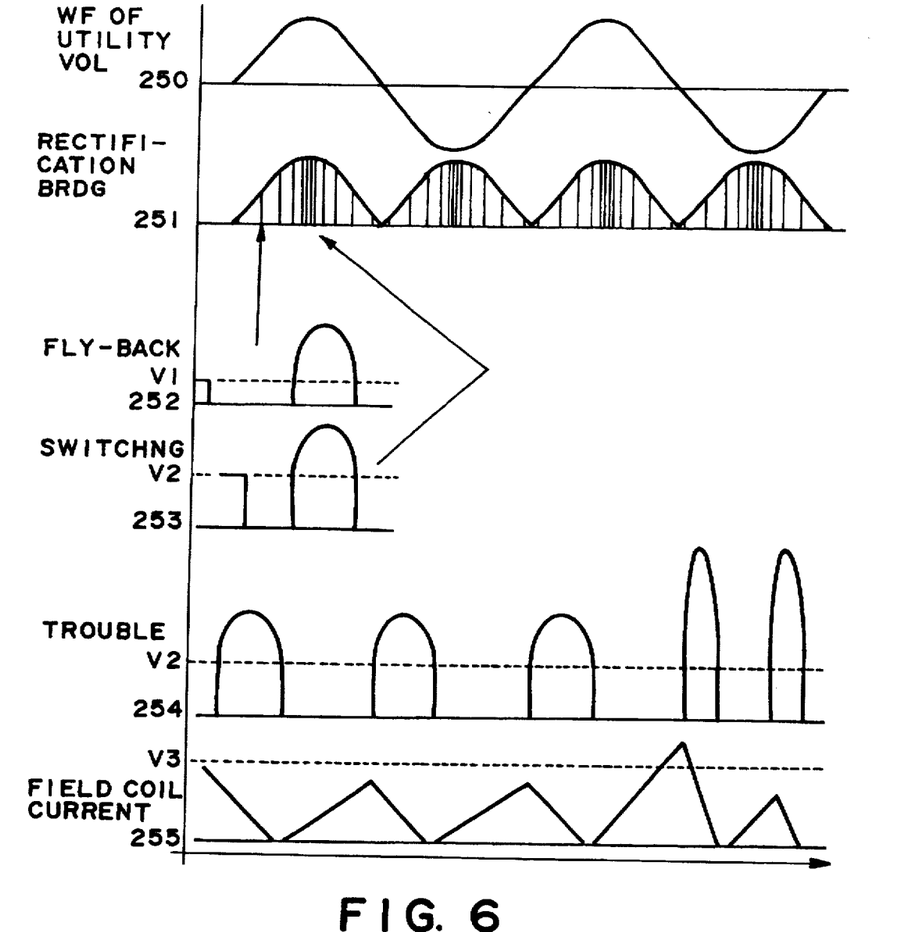
FIG. 6 illustrates a trouble wave form in the energy supply.

The operational waveform with the above structure is shown in FIG. 6. Designated by 250 is a waveform of the utility AC voltage source; 251 is a waveform outputted through the rectifying bridge 200; 252 is a flyback waveform upon high frequency switching by a switching control element (FET) 201. Designated by 253 is a waveform in a relatively high voltage in the rectifying ripple.

The switching frequency is modulated in accordance with the voltage level of the input voltage waveform (utility AC voltage), because the current as close as possible to the sine wave in order to improve the power factor of the input current waveform of the voltage source.

In order to accomplish this, the voltage divided out by the resistors 221 and 222 shown in FIG. 5 is monitored, and in response to the voltage, the capacitor determining the oscillating frequency and the resistance 34 regulating the discharge current are controlled.

The rectification wave ripple voltage supplied to an end of a field coil, when the switching control is ejected with high frequency switching element 201, accumulates the electric power in the excitation inductance of the field coil as magnetic field, and magnetically coupled with the heater metal 7 corresponding to the load. Thus, the eddy currents flow by the magnetic field so that the joule heat is produced by resistance loss of the metal, and therefore, heat the heater metal 7.

Figure 7:
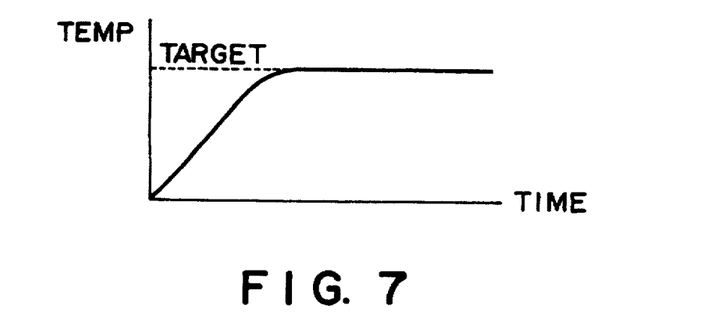
FIG. 7 is a graph of heater temperature vs. time in an ideal state.

As described above, since the heater is the heater metal 7 per se directly contacted to the film 1, the heat transfer model from the heat source is very simple. The voltage drop detection of the copper ring 105 using the induction coil is used by the operational amplifier to effect the feed back control. Therefore, a stabilized fixing temperature with less overshooting as shown in FIG. 7 can be provided. Additionally, there is no need of wiring a temperature sensor element to the heater, and therefore, the structure around the heater is simple (without wiring).

Thus, when the direct heating type using magnetic induction heating is used, and when the heater metal directly heated is in the form of a film, very quick temperature rise is accomplished due to the fact that the specific heat is low.

The description will be made as to safety circuit for preventing overheating.

In the circuit of FIG. 5, a drain voltage of the FET is detected at an end of the excitation coil, and a zero-cross of the flyback voltage waveform is detected by a zero-cross detection circuit 212. Using the detected timing as synchronization signal, and as a starting signal for on-width control circuit in accordance with the temperature data provided by the temperature detection, the charging and discharging of the capacitor of the timing generating circuit is controlled, thus switching the circuit in synchronism with the flyback waveform.

In FIG. 6, designated by a reference numeral 254 is a waveform which may occur when the input voltage is improperly high, or when a mechanical blade of the field coil in the fixing station (crack, introduction of falling matter into the magnetic path or the like). The on-period width is a width determined on the basis of the voltage indicative of the sensed temperature, the off-width, i.e., the flyback waveform is definitely determined by a resonance capacitance and the inductance of the coil, and is known as follows:

$$=1/LC$$

Designated by 255 is the current waveform of the current through the field coil.

Therefore, when some trouble occurs due to the brake of the magnetic circuit or introduction of foreign matter or the like for some reason or another, the measurement against it can be taken if the period and the current waveform is monitored since the circuit is in synchronism.

Into the current detecting circuit 220 of FIG. 5, a predetermined reference voltage indicative of abnormal situation to be compared with the detected voltage. By doing so, an excessive current can be detected. Additionally, periodic data are obtained using temperature data, zero-cross points of the flyback detection waveform and a timer or the like, the above data are supplied to an abnormal state detecting circuit 224. For example, the abnormal state is detected when 1. the period is high,
2. the current level is excessively high,
3. detection of the temperature sensor is beyond a limit.

Optionally in combination with 4. current is large despite the temperature increase is small.

The above enumerated facts are all indicative of the abnormal states of the magnetic circuit of the induction heating portion or the temperature sensing system. When this is discriminated, the converter is instantaneously stopped, and the event is transmitted to the sequential control roller to permit shut-down the control circuit to assure the safety.

A magnetic permeability of the magnetic material used as the heater metal 7 has a dependency on the temperature. For example, the Currie temperature (loss of magnetic property) is approx. 230° C. in the case of ferrite, and approx. 450° C.

in the case of permalloy metal. This means that the heating means is very safe as compared with a system using a heater since even upon any unexpected situation occurring, the magnetic flux is produced only under that temperature.

Referring to FIGS. 8–11, a second embodiment will be described.

Figure 8:
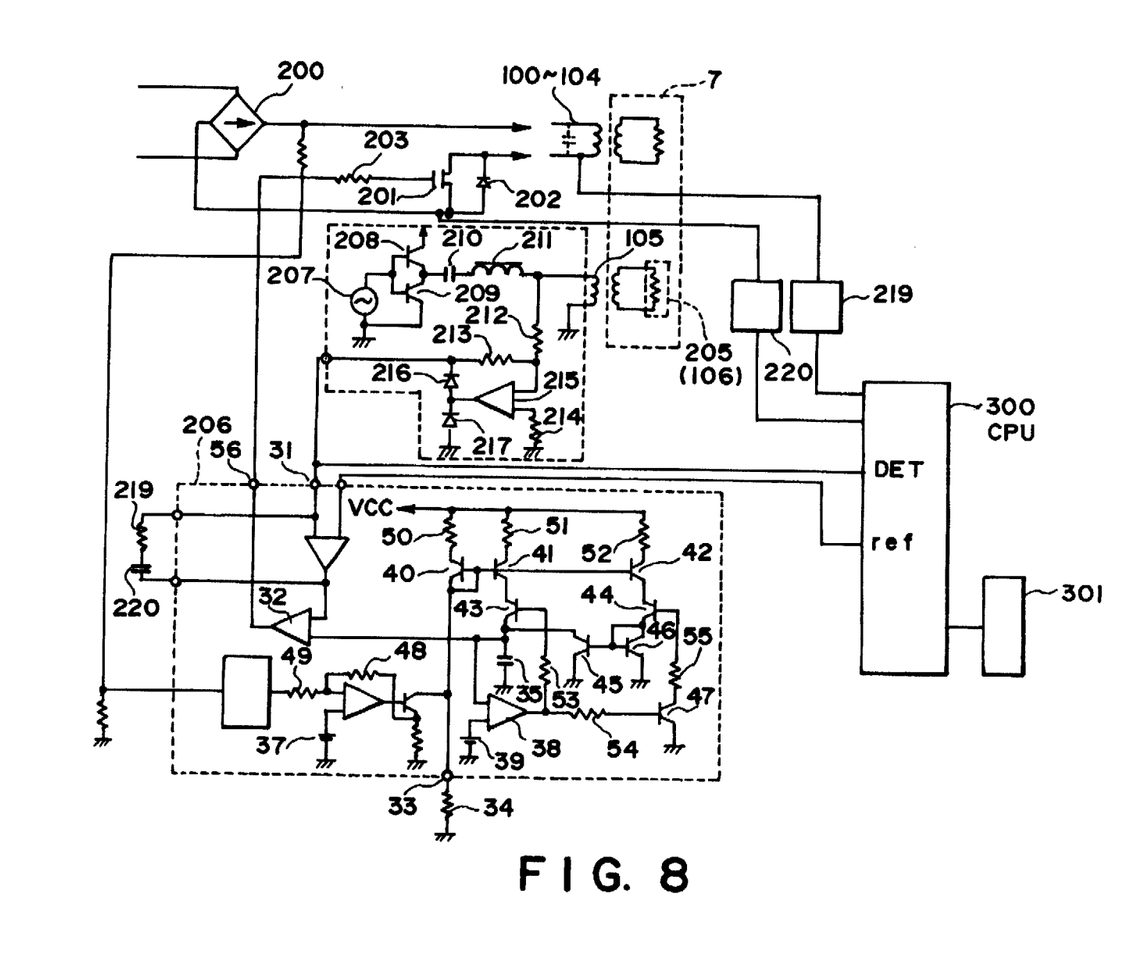
FIG. 8 is a circuit diagram of the system according to a second embodiment of the present invention.

The control circuit shown in FIG. 8 is similar to the circuit of FIG. 5 according to the above-described embodiment 1. Designated by 300 is a processing CPU effecting print sequential control for the printer which is the apparatus of this embodiment, and 301 is a temperature connected with the processing CPU.

In an electrophotographic type printer, for example, the image is reproduced using toner and charging the photosensitive drum, and therefore, the property of the reproduction is significantly dependent on the ambient conditions. The dependency can be overcome by strictly controlling the accuracy of parts and latitude thereof, for example. However, in the case of multi-color printer or the like, the number of controlling parameter is so large that the temperature or humidity sensors are used from the standpoint of the demand for the high quality image. In this embodiment, the data from the temperature and humidity sensors are used to calibrate the target temperature (fixing temperature) of the temperature detecting circuit and the sensor.

Figure 9:
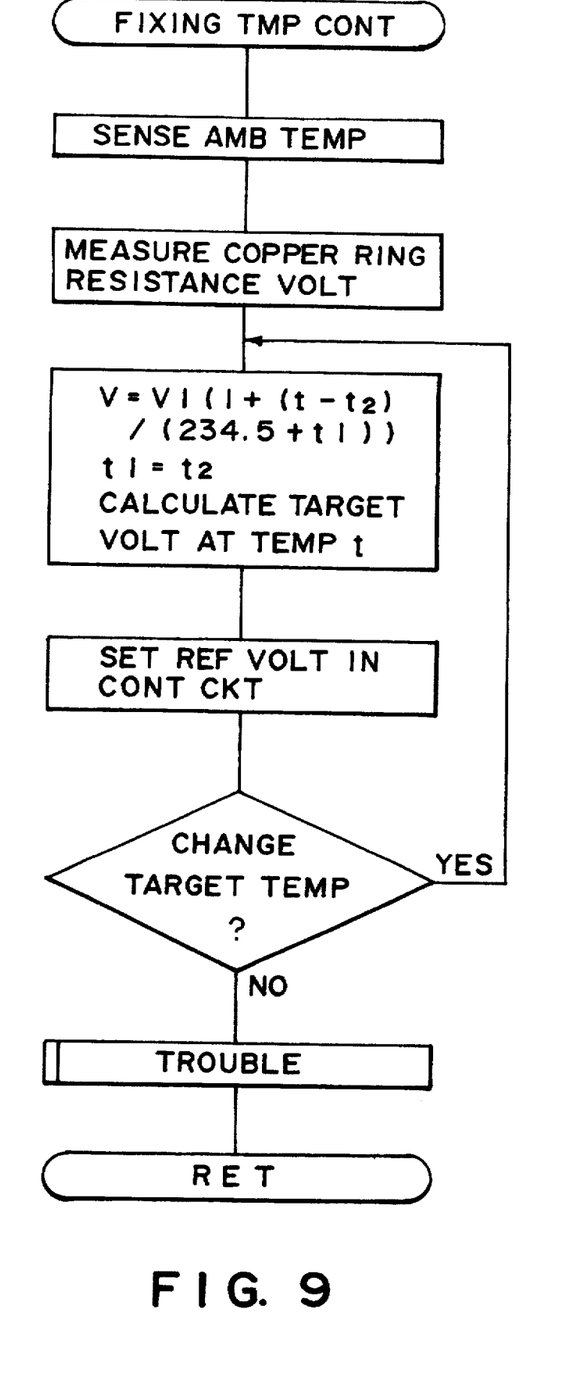
FIG. 9 is a flow chart of a temperature detection sequence in the second embodiment.

FIG. 9 is a flow chart illustrating the processing of the fixing temperature control. After the main switch is actuated (it is assumed that the fixing device is not actuated), an ambient temperature sensor 301 detect the ambient temperature ($t_1$). At this time, the reference temperature voltage supplied from the CPU 300 to the control circuit is 0 V. In other words, the current does not flow through the field coils 100–104. Subsequently, the output voltage from the detection circuit (OPAMP 215) is read in at the CPU port (V1). From the measurements V1 and $t_1$, a target reference voltage as the fixing target temperature t is determined as follows:

$$V=V1 \ (1+(t-t_2)/(234.5+t_1))$$

For example, when the measurements t=160° C., V1=2.5 V, $t_1$=25° C., $t_2$=25° C., the following results from the above equation:

$$v=2.5 \ (1+(160-25)/(234.5+25))=\%[V]$$

Figure 10:
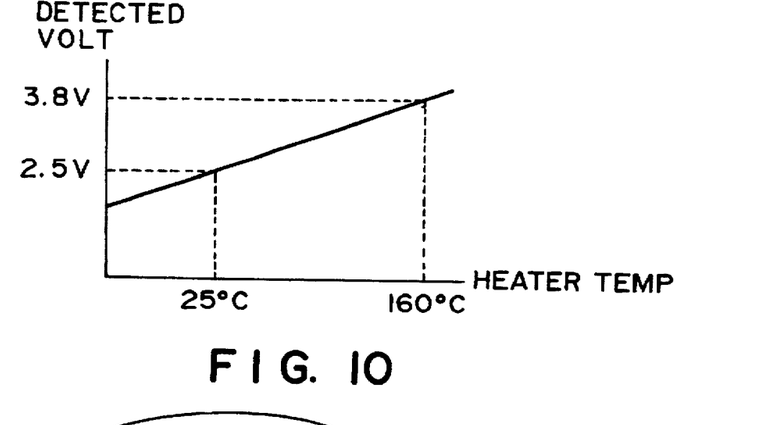
FIG. 10 is a graph of heater sensor vs. detected voltage.

FIG. 10 shows a relationship between the fixing temperature and the detected voltage under the above-described conditions. When 3.8 V is supplied from the CPU to the control circuit as the reference voltage, the temperature of the heater metal 7 quickly starts the heating toward the target temperature 160° C.

The temperature of the heater is increased to the target temperature while the comparison is made with the voltage level (temperature of the heater metal) of the voltage reduction monitoring circuit using the copper ring 106 and while controlling the gate waveform of FET 201 which switches the field coils 100–104.

Through the above-described operations, the external circuit is not subjected to particularly complicated control, and high speed and less overshooting starting operation is accomplished.

In the foregoing descriptions, the voltage drop in the copper ring 106 has been used. However, this is not limiting, and if a temperature coefficient of the resistivity is known, the above embodiments are effective. For the purpose of easy understanding, the copper is in the form of a metal, but the same detection is possible when a metal plate is used.

On the basis of the temperature detection, the drain voltage of FET 201 in the circuit of FIG. 8 is detected, at an end of the excitation coil, and the zero-cross point of the flyback voltage waveform is detected by the zero-cross detecting circuit. The recurrent detecting circuit 219 is supplied with a reference voltage for the abnormality detection to detect the excessive current. The zero-cross of the flyback detection waveform as periodical data using a timer or the like. The data are supplied to CPU 300 to detect the abnormality. For example, the abnormal state is detected when 1. the period is high,
2. the current level is excessively high,
3. detection of the temperature sensor is beyond a limit.

Optionally in combination with 4. current is large despite the temperature increase is small.

The above enumerated facts are all indicative of the abnormal states of the magnetic circuit of the induction heating portion or the temperature sensing system. When this is discriminated, the converter is instantaneously stopped, and the event is transmitted to the sequential control roller to permit shut-down the control circuit to assure the safety.

Figure 11:
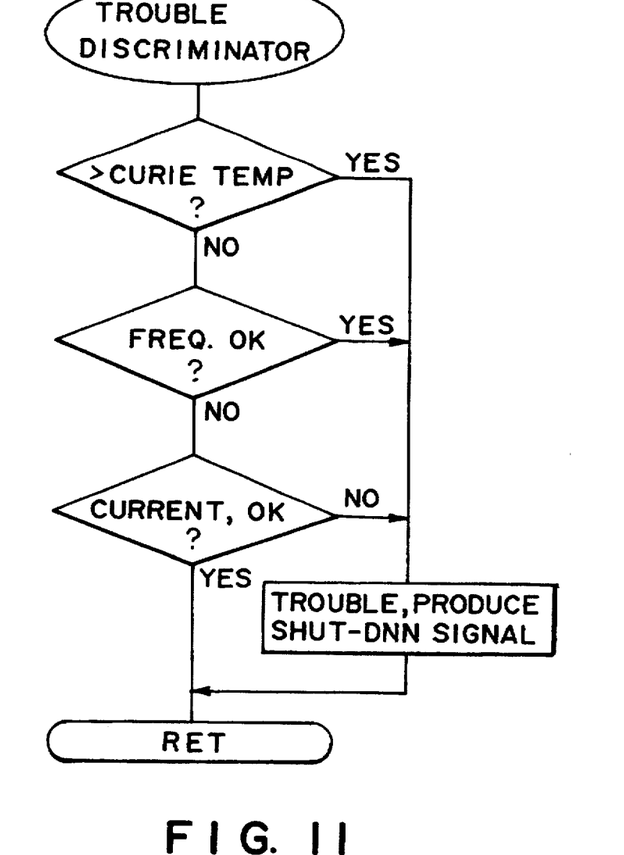
FIG. 11 is a flow chart of discrimination sequence for abnormal state of the fixing device.

FIG. 11 is a flow chart of the control for the abnormality detection.

Figure 12:
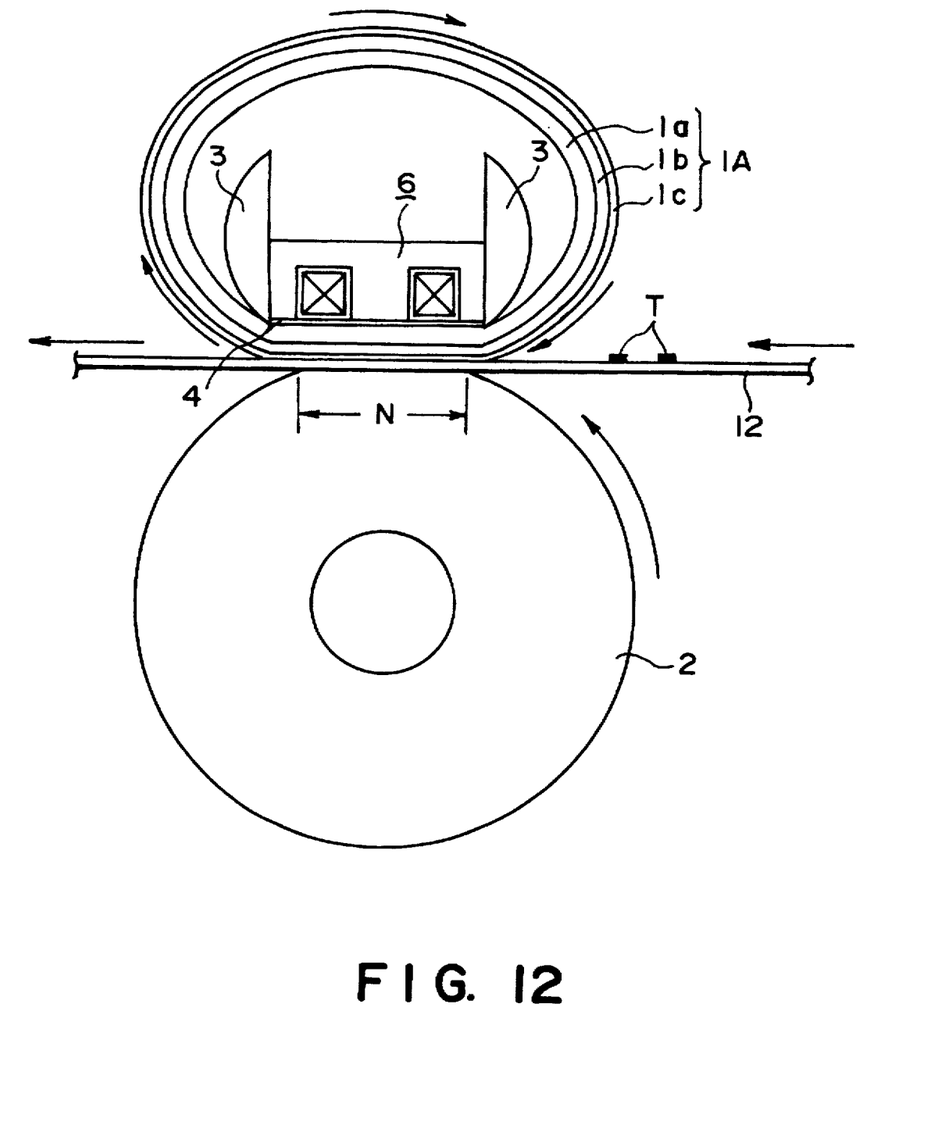
FIGS. 12 and 13(a)-(c) are sectional views of another fixing apparatus to which the present invention is applicable.

Referring to FIG. 12, there is shown another structure of an image fixing apparatus usable with the temperature sensor of this invention. In this apparatus, the film per se in Embodiment 1 or in the apparatus of FIG. 2 is a magnetic metal film, which may be a film having a magnetic metal layer, or magnetic metal film per se, which will hereinafter be called magnetic metal film. By doing so, the heat is produced by the magnetic induction heating. The recording material closely contacted thereto is heated.

A field coil unit 6 functions as the magnetic field generating means comprising an E-shaped core (magnetic material) wound by excitation coil. It is an elongated member extended in a direction crossing with (perpendicular to) the feeding direction of the recording material and the magnetic metal film 1a.

Designated by reference numerals 3 and 3 are stays for supporting the field coil unit 6 and maintaining the traveling of the magnetic metal film 1A and is made of liquid crystal polymer, phenol resin or the like, and a sliding plate is bonded to the portion slidable relative to the film.

The stays 3 and 3 are elongated members sandwiching the field coil unit 6 at the longitudinal opposite ends thereof with the three feet of E-shaped core metal faced down.

A film sliding plate (sliding plate) 4 is provided on the down-facing surface of the E-shaped core member, and it is of glass or the like exhibiting low friction resistance relative to the magnetic metal film 1A. It is preferable that the surface thereof is coated with lubricant such as grease, oil or the like. Alternatively, the core material of the field coil unit finished into a flat surface to provide a sliding surface relative to the film.

A heat-resistive magnetic metal film 1A of endless belt or cylinder (seamless) is loosely fitted to the outside of the assembly (magnetic induction heater assembly) comprising the field coil unit 6, stays 3 and film sliding plate 2 and the like.

A pressing roller 2 comprises a core metal and silicone rubber, fluorine rubber or the like. The pressing roller 2 is urged to the bottom surface of the film sliding plate 2 with the magnetic metal film 1A therebetween by unshown bearing means or urging means to constitute a fixing nip with the bottom surface of the film sliding plate 2 with the 1a therebetween.

The pressing roller 2 is rotated in the indicated counter-clockwisely by driving means. Rotational driving force is applied to the magnetic metal film 1A due to the friction between the pressing roller 2 and the outer surface of the film to rotate the magnetic metal film 1A around the assembly while being in sliding contact with the bottom surface of the film sliding plate 2.

The magnetic metal film 1A comprises a base layer 1a of heat-resistive resin material such as polyimide, polyamidemide, PEEK, PES, PPS, PFA, PTFE, FEP or the like having a thickness of 10–100 microns, and a coating (plated or the like) layer, on the outer periphery of the base layer 1a (the surface contactable to the material to be heated), of a thickness of 1–100 microns of magnetic metal layer 1b and of Fe, Co, Ni, Cu, Cr or the like, and a surface layer, on a free surface of the magnetic metal layer 1b, of a parting and heat resistive material of PFA, PTFE, FEP, silicone resin or the like alone or mixture thereof. In this example, the base layer 1a and magnetic metal layer 1b are separate layers, but the base layer 1a per se may be the magnetic metal layer.

When a current is applied from an unshown excitation circuit to the excitation coil of the field coil unit 6, the magnetic metal layer 1b of the magnetic metal film 1A generates heat by magnetic induction heating.

The magnetic metal film 1A is rotated by the pressing roller 2, and a recording material 12 is introduced into the nip N, while the heat is generated as described above. The recording material 12 is moved with the film while being in close contact with the magnetic metal film 1A surface, so that the heat is transferred to the unfixed toner image T, which is thus fixed.

With this structure, the heat is directly generated by the neighborhood of the surface layer of the magnetic metal film 1A, and therefore, the quick heating is accomplished irrespective of the thermal conductivity or the thermal capacity of the base layer 1a. Additionally, the thickness of magnetic metal film 1A is not influential, the temperature increase up to the fixing temperature is quick even if the base layer 1a of the magnetic metal film 1A is increased in order to improve the rigidity of the magnetic metal film 1A for the purpose of increasing the processing speed. Furthermore, the base layer 1a is of low thermal conductivity material resin, and therefore, the thermal insulation is so high that the heat is substantially isolated from the parts having a larger thermal capacity, such as inside coil or the like. Therefore, the heat loss is small, and the energy efficiency is high. Since the heat is not transmitted to the inside coil, the coil can maintain its performance. Corresponding to the improvement of the thermal efficiency, the temperature rise in the apparatus can be suppressed, so that the thermal influence to the image forming station of the image forming apparatus can be reduced when the embodiment is used for an image forming apparatus.

Thus, the film is of magnetic metal material, and the film per se produces heat through magnetic induction. The recording material 12 closely contacted thereto is heated thereby. In such structure, a temperature sensing field coil 105 may be provided in the field coil unit 6 (magnetic field generating means) similarly to embodiments 1 and 2. At a position corresponding to the temperature sensing field coil 105, a copper ring 106 is provided in a circumferential direction of the cylindrical film to effect the temperature control similar to embodiment 1.

Figure 13A:
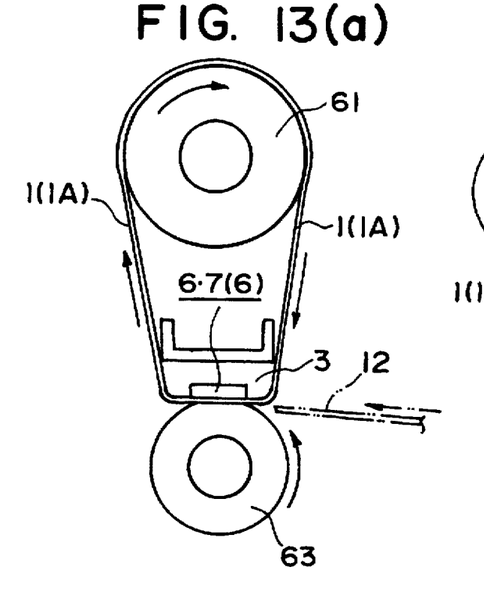
Figure 13B:
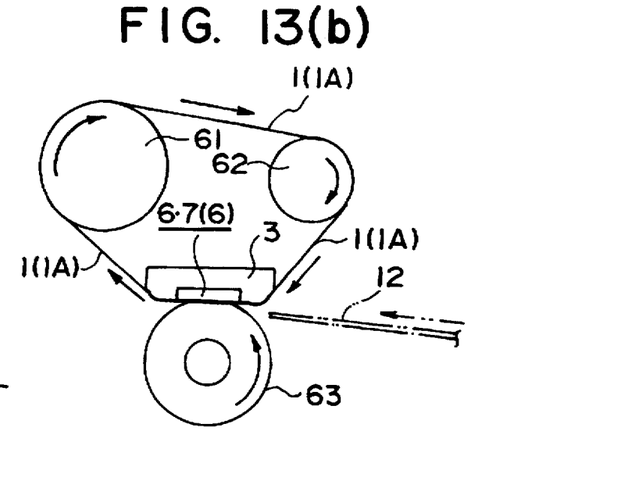
Figure 13C:
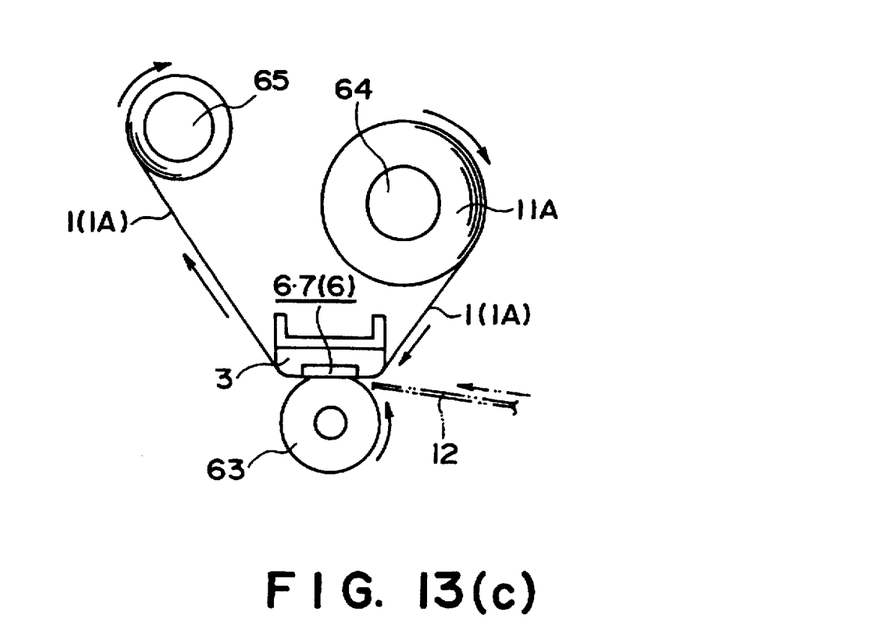

FIGS. 13, (a), (b) and (c), show other examples of Minolta and film heating type apparatuses.

In (a), around the three members i.e., the bottom surface of the magnetic field generating means 6 and 7 (or 6), the driving roller 61 and follower roller (tension roller) 62, the endless film 1A is extended, and the film 1 is driven by the driving roller 61. A pressing roller 63 is press-contacted to the bottom surface of the magnetic field generating means 6, 7 (or 6), and it rotates following rotation of the film 1 (1A).

In (b), the endless film 1 (1A) is extended around the bottom surface of the magnetic field generating means 6, 7 (or 6) and the driving roller 61.

In (c), the film 1 (1A) is not in the form of an endless belt, but is in the form of a roll. This is supplied out from a supply reel 64 to a take-up reel 65 through the bottom surface of the magnetic field generating means 6, 7 (or 6).

In the foregoing embodiments, the direction of the magnetic field perpendicularly to the magnetic metal members 7 and 1b, but the magnetic field may be applied in a direction parallel to the layer surface.

Although the description has been made with respect to the heating film, but the present invention is applicable to heat roller.

Figure 14:
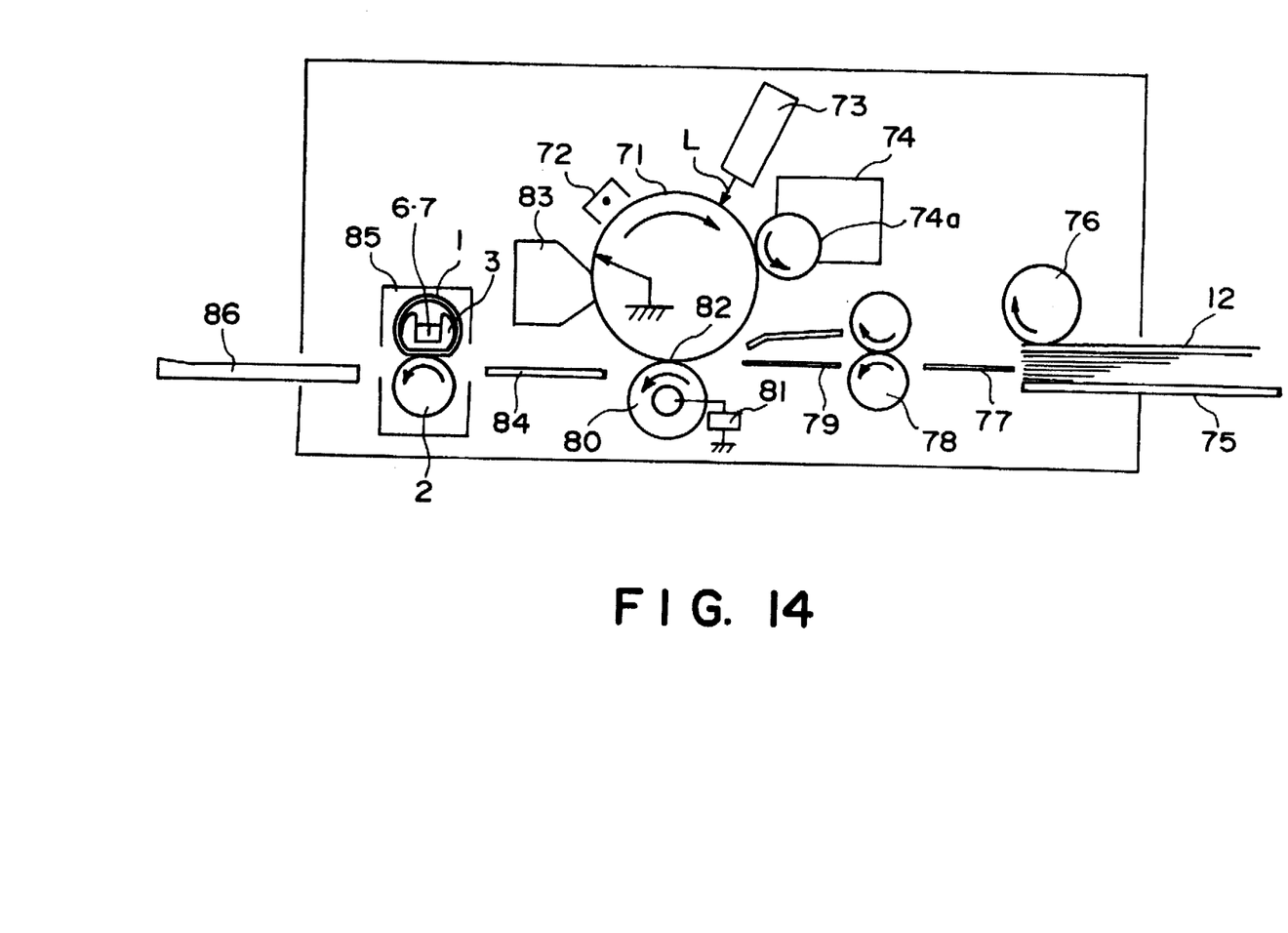
FIG. 14 is a sectional view of an image forming apparatus using the fixing apparatus of this invention.

The description will be made as to an image forming apparatus with which the heating apparatus of the present invention is used. The image forming apparatus is a laser beam printer of electrophotographic type.

A photosensitive member 71 is a rotatable drum type (first image bearing member). The photosensitive member 71 is rotated at a predetermined peripheral speed (process speed) in the clockwise direction. During the rotation, the surface thereof is uniformly charged by a primary charger 72 to a predetermined dark potential VD (negative).

A laser beam scanner 73 produced a laser beam modulated in accordance with time series electric digital pixel signals indicative of the intended image inputted from a host device such as unshown image reader, word processor, computer or the like. The surface of the photosensitive member 71 uniformly charged by the primary charger 72 is exposed to the laser beam, so that the potential of the exposed portion deceases in the absolute value to a light potential (VL), thus forming an electrostatic latent image thereon in accordance with the intended image.

The latent image is subjected to reverse-development by a developing device 74 with toner powder charged to the negative polarity (the toner is deposited to the portion exposed to the laser beam).

The developing device 74 comprises a developing sleeve 74a on which a thin layer of toner particles charged to the negative polarity is applied. The layer is opposed to the surface of the photosensitive member 71. The developing sleeve 74a is supplied with a developing bias voltage VDC which has an absolute value smaller than the dark potential VD of the photosensitive member 71 and larger than the light potential VL, so that the toner transfers from the developing device 74 to the photosensitive member 71 only at the light potential portion (reverse development).

On the other hand, a recording material P (second image bearing member, transfer material) stacked on a sheet feeding tray 75 is fed out one by one by a pick-up roller 76, and is fed along a feeding guide 77, a pair of registration rollers 78 and pre-transfer guide 79, to an image transfer nip 82 constituted by the photosensitive member 71 and transfer roller 80 (transfer member) supplied with a transfer bias from a voltage source 81, at a timed relation with the rotation of the photosensitive member 71. The toner image is transferred from the photosensitive member 71 to the recording material 12. The transfer roller 80 preferably has a volume resistivity of $10^8$–10 g ohm.cm.

The recording material 12 having passed through the transfer nip is separated from the surface of the photosensitive member 71, and is introduced into a fixing device 85 through a guide 84. It is subjected to an image fixing operation, and then discharged as a print. After the separation of the recording material 12 from the photosensitive member 71, the residual matter is removed therefrom by a cleaning device 83, and is prepared for the next image forming operation.

While the invention has been described with reference to the structures disclosed herein, it is not confined to the details set forth and this application is intended to cover such modifications or changes as may come within the purposes of the improvements or the scope of the following claims.

What is claimed is:

1. An image heating apparatus, comprising:
    a heater for heating an image carried on a recording material, said heater having a metal layer for generating heat by electric energy supply thereto;
    an excitation coil magnetically couplable with said metal layer, said excitation coil being supplied with an AC electric energy;
    means for detecting a voltage drop, across said excitation coil, which changes with a temperature of the heater; and
    electric energy control means for controlling electric energy to be supplied to said metal layer in accordance with an output of said detecting means, wherein said metal layer has a metal ring therein, and said excitation coil is in magnetical connection with said metal ring.

2. An apparatus according to claim 1, wherein the AC current through said excition coil is constant.

3. An apparatus according to claim 1, further comprising a second excitation coil, a voltage source for supplying an AC current to said second coil, wherein said heater generates heat by eddy currents provided therein.

4. An apparatus according to claim 3, further comprising a film slidable relative to said heater and movable together with a recording material carrying an unfixed image.

5. An apparatus according to claim 3, wherein said heater is in the form of a film.

6. An image heating apparatus comprising:
    a fixed heat generating member having an electroconductive element;
    magnetic flux generating means for generating a magnetic flux, wherein eddy current is produced in said heat generating member to generate heat therein;
    a film contactable to and movable with a recording material carrying an image, which is heated by the heat through said film, wherein a side of said film opposite from a side contactable to said recording material, is contacted to said heat generating element.

7. An apparatus according to claim 6, wherein said heat generating element is of metal.

8. An apparatus according to claim 6, wherein said magnetic flux generating means includes an excitation coil.

* * * * *

UNITED STATES PATENT AND TRADEMARK OFFICE
CERTIFICATE OF CORRECTION

PATENT NO. : 5,801,359

DATED : September 1, 1998

INVENTORS : HIROSHI MANO, ET AL.

Page 1 of 3

It is certified that error appears in the above-identified patent and that said Letters Patent is hereby corrected as shown below:

On the title page, item [54] and Column 1, line 1.

Title, "DEFECTS" should read --DETECTS--.

Item [56] RC,
FPD, "4204980" and "4204984" should read --4-204980--, and --4-204984--, respectively.

[Item] [57] ABSTRACT,
Line 2, "with" should read --with a--.

COLUMN 1,
Line 14, "thermisters" should read --thermistors--;
Line 15, "thermister" should read --thermistor--;
Line 21, "are" should read --is--; and
Line 23, "thermister" should read --thermistor--.

COLUMN 3,
Line 7, "into" should be deleted.

UNITED STATES PATENT AND TRADEMARK OFFICE
CERTIFICATE OF CORRECTION

PATENT NO. : 5,801,359

DATED : September 1, 1998

INVENTORS : HIROSHI MANO, ET AL.   Page 2 of 3

It is certified that error appears in the above-identified patent and that said Letters Patent is hereby corrected as shown below:

COLUMN 3 (Cont.),
Line 31, "(excitation" should read --(excitation)--.

COLUMN 4,
Line 8, "occurs" should read --occur--.

COLUMN 5,
Line 26, "thermister" should read --thermistor--.

COLUMN 6,
Line 55, "the" should read --the fact that the--;
Line 62, "the" should read --of the--; and
Line 63, "the" should be deleted.

COLUMN 7,
Line 20, "parameter" should read --parameters--.

UNITED STATES PATENT AND TRADEMARK OFFICE
CERTIFICATE OF CORRECTION

PATENT NO. : 5,801,359
DATED : September 1, 1998
INVENTOR(S) : HIROSHI MANO, ET AL.

It is certified that error appears in the above-identified patent and that said Letters Patent is hereby corrected as shown below:

COLUMN 8,
Line 15, "is" should read --being--;
Line 23, "the" should read --of the--; and
Line 24, "the" should be deleted.

COLUMN 9,
Line 2, "1a" should read --base layer 1a--; and
Line 4, "clockwisely" should read --clockwise direction--.

COLUMN 10,
Line 16, " perpendicularly" should read --is perpendicular--; and
Line 67, "$10^8 - 10g$" should read --$10^8 - 10^9$--.

Signed and Sealed this

Fourth Day of May, 1999

Attest:

Attesting Officer

Q. TODD DICKINSON

Acting Commissioner of Patents and Trademarks